(12) United States Patent
Rasmussen et al.

(10) Patent No.: US 6,834,795 B1
(45) Date of Patent: Dec. 28, 2004

(54) SECURE USER AUTHENTICATION TO COMPUTING RESOURCE VIA SMART CARD

(75) Inventors: Brian Rasmussen, Sunnyvale, CA (US); Matthew Harmsen, Los Altos, CA (US)

(73) Assignees: Sun Microsystems, Inc., Santa Clara, CA (US); Netscape Communications Corporation, Mountain View, CA (US)

( * ) Notice: Subject to any disclaimer, the term of this patent is extended or adjusted under 35 U.S.C. 154(b) by 47 days.

(21) Appl. No.: 09/895,510

(22) Filed: Jun. 29, 2001

(51) Int. Cl.$^7$ .............................................. G06K 5/00
(52) U.S. Cl. ..................................................... 235/380
(58) Field of Search ................................ 235/380, 375, 235/382, 485, 487, 492; 713/200, 176, 182, 161, 167, 168, 169, 170, 171, 183, 201, 180; 380/30, 277, 279; 711/164; 707/9

(56) References Cited

U.S. PATENT DOCUMENTS

| | | | | | |
|---|---|---|---|---|---|
| 5,120,939 A | * | 6/1992 | Claus et al. | ................ | 235/382 |
| 5,220,604 A | * | 6/1993 | Gasser et al. | .................. | 707/9 |
| 5,799,086 A | * | 8/1998 | Sudia | .......................... | 705/76 |
| 5,872,844 A | * | 2/1999 | Yacobi | ......................... | 705/69 |
| 5,889,941 A | * | 3/1999 | Tushie et al. | ............... | 713/200 |
| 5,910,989 A | * | 6/1999 | Naccache | .................... | 713/173 |
| 5,943,423 A | * | 8/1999 | Muftic | ......................... | 705/67 |
| 6,233,683 B1 | * | 5/2001 | Chan et al. | ................. | 713/172 |
| 6,257,486 B1 | * | 7/2001 | Teicher et al. | .............. | 235/380 |
| 6,260,111 B1 | * | 7/2001 | Craig et al. | ................. | 711/115 |
| 6,308,268 B1 | * | 10/2001 | Audebert | .................... | 713/182 |
| 6,327,659 B2 | * | 12/2001 | Boroditsky et al. | ......... | 713/182 |
| 6,332,192 B1 | * | 12/2001 | Boroditsky et al. | ......... | 713/168 |
| 6,401,206 B1 | * | 6/2002 | Khan et al. | ................. | 713/176 |
| 6,402,028 B1 | * | 6/2002 | Graham et al. | ............. | 235/380 |
| 6,481,632 B2 | * | 11/2002 | Wentker et al. | ............. | 235/492 |
| 6,588,673 B1 | * | 7/2003 | Chan et al. | ................. | 235/492 |
| 6,612,486 B2 | * | 9/2003 | Sato et al. | .................. | 235/375 |

* cited by examiner

*Primary Examiner*—Thien M. Le
*Assistant Examiner*—Edwyn Labaze
(74) *Attorney, Agent, or Firm*—Osha & May L.L.P.

(57) ABSTRACT

A simplified user authentication to a computer resource utilizing a smart card. When a new user is issued a smart card, he or she is also issued a user name (ID) and password to be used during a first use to activate the smart card. The user then connects the smart card and enters the user ID and password. The user is authenticated using the user ID and password and identifying information from the smart card. The network administration server then requests a public key from the workstation. The workstation instructs the smart card to generates public and private key. The public key is transmitted to the server. A digital certificate is created the smart card is activated. Once the smart card is activated a simplified login procedure can be used wherein connecting the smart card to a workstation initiates a login process not requiring use of a PIN number or other user input.

19 Claims, 5 Drawing Sheets

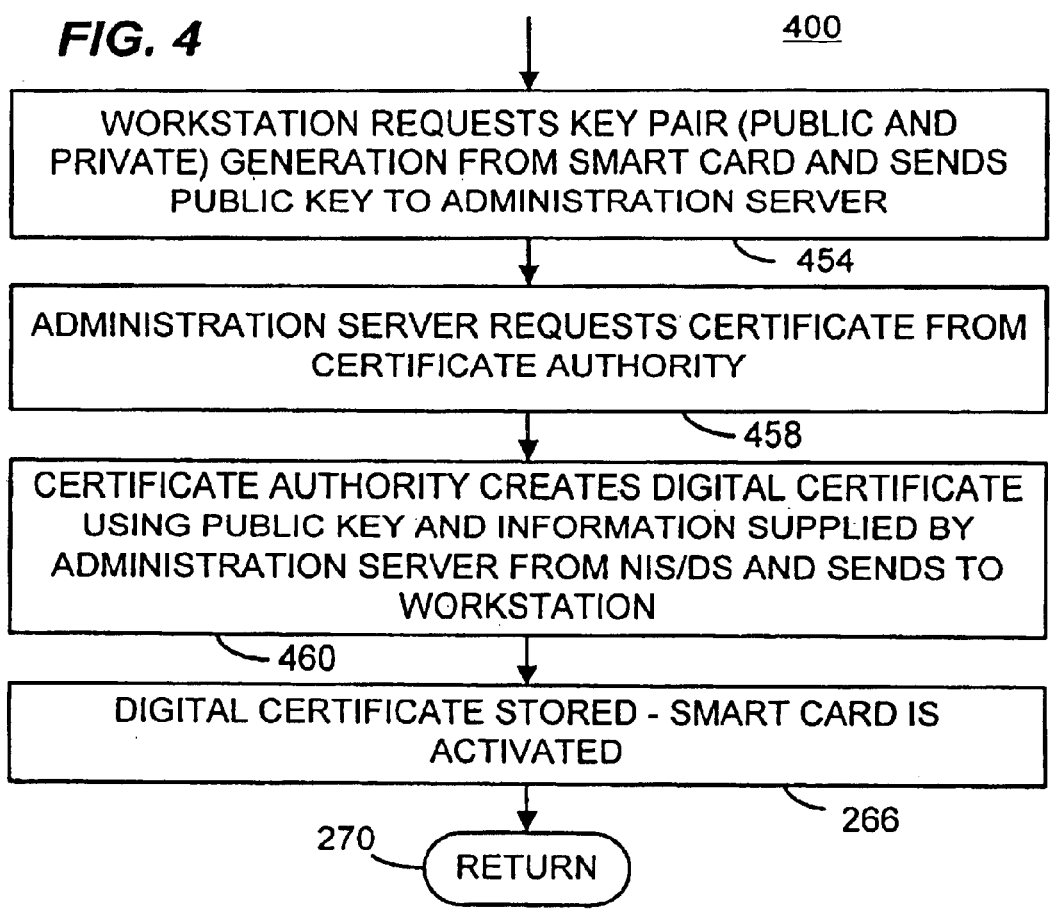

SECURE USER AUTHENTICATION TO COMPUTING RESOURCE VIA SMART CARD

FIELD OF THE INVENTION

This invention relates generally to the field of computer security. More particularly, this invention relates to use of smart cards to provide access to computing resources.

BACKGROUND OF THE INVENTION

Smart cards are currently used in some environments to provide secure access to high security computing resources. Typically, a user receives a smart card and PIN (Personal Identification Number) from a network administrator. The smart card is then activated by the network administrator after a sequence of communications between the network administrator and the user. The current procedures can be time consuming for both the user and the network administrator.

Once the smart card is activated, the user obtains access to computing resources by inserting the smart card into a smart card reader at a computer workstation or the like and enters a PIN code on a touchpad or from a keyboard. Such use of smart cards provides a relatively high level of security against unauthorized use of a computing resource, but is not without drawbacks.

As previously mentioned, the process of activating smart cards is currently a time consuming manual process. Moreover, since the smart card often resides in the smart card reader during the course of a user's session, the user is prone to forgetting the smart card—leaving it in the reader and thus compromising security. Although smart cards are currently used primarily in very high security environments, the cost of these smart cards is dropping rapidly, making them suitable for use in environments with less stringent security requirements, and often with less sophisticated users.

SUMMARY OF THE INVENTION

The present invention relates generally to computer security. Objects, advantages and features of the invention will become apparent to those skilled in the art upon consideration of the following detailed description of the invention.

In one embodiment of the present invention a simplified user authentication to a computer resource is provided utilizing a smart card. When a new user is issued a smart card, he or she is also issued a user name (ID) and password to be used during a first use to activate the smart card. The user then connects the smart card and enters the user ID and password. The user is authenticated using the user ID and password and identifying information from the smart card. The network administration server then requests a public key from the workstation. The workstation instructs the smart card to generate public and private keys. The public key is transmitted to the server. A digital certificate is created and the smart card is activated. Once the smart card is activated a simplified login procedure can be used wherein connecting the smart card to a workstation initiates a login process not requiring use of a PIN number or other user input.

In one embodiment consistent with the present invention, a method of using a smart card, includes issuing a smart card to a user; issuing manual authentication information to the user; authenticating the user and the smart card using the manual authentication information; obtaining a public key from the smart card; and issuing a digital certificate using the public key to the smart card to activate the smart card.

Another method, consistent with an embodiment of the present invention, of using a smart card includes receiving a smart card; receiving manual authentication information; authenticating the smart card using the manual authentication information; generating a public key using the smart card; sending the public key to an administration server; and receiving a digital certificate generated using the public key to activate the smart card.

Another method, consistent with an embodiment of the present invention, of using a smart card, includes connecting the smart card to a workstation; sending a login request to a server; authenticating a digital certificate for the smart card; and if authenticated, permitting a login to a computer resource.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 4 is a flow chart depicting modifications of the smart card activation process of FIG. 2 consistent with another embodiment of the present invention.

FIG. 5 illustrates an exemplary administrative screen shot for establishing a level of smart card login security.

DETAILED DESCRIPTION OF THE INVENTION

Figure 1:
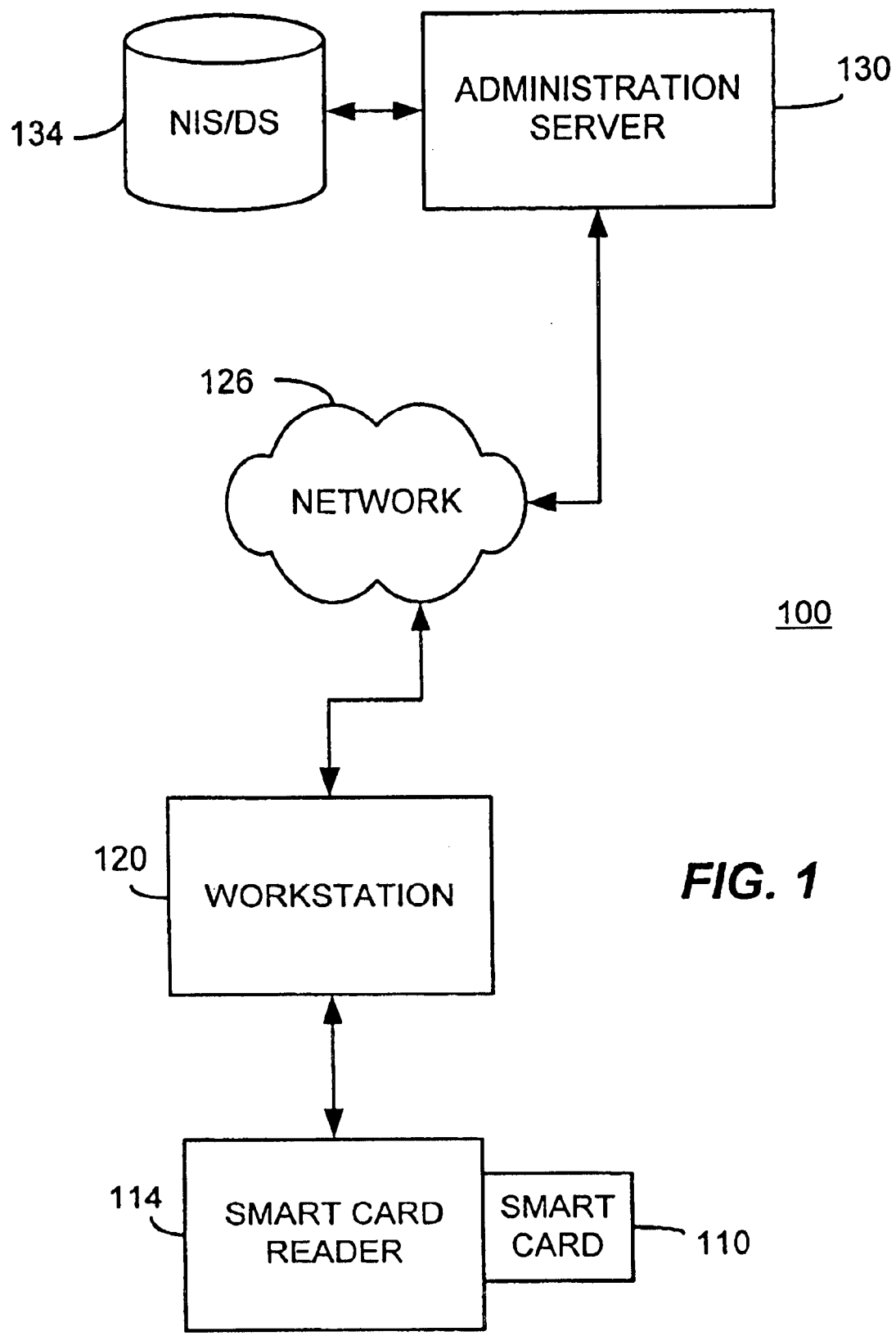
FIG. 1 is a block diagram of a system suitable for use of an embodiment consistent with the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "authenticating" or "initiating" or "determining" or "obtaining" or "sending" or "verifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Secure User Authentication to Computing Resource via Smart Card in Accordance with the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, an exemplary network 100 is illustrated. A smart card 110 can be inserted into an appropriate connector in a smart card reader 114. Smart card reader 114 is connected to, or forms apart of, a workstation 120 connected to a computer network 126. Access to the network resources and issuance of smart cards, passwords, login identification, etc. is administered using an administration server 130 which is coupled to network information services or directory services (NIS/DS) database 134. In network 100, administration server 130 also provides the function of administration of digital certificates. Smart card 110 is utilized by a user to obtain access to any of the computing resources available in network 126 including various file servers and the like. Depending upon the level of security required, it may be desirable to permit a user to login using smart card 110 as the only authentication mechanism. That is, while conventional security systems require a smart card 110 in combination with personal identification number PIN, in less secure situations it may be useful to permit connection of the smart card 110 to initiate a user login. Moreover, it may also be desirable to permit a user to activate a smart card 110 without intensive involvement of network administration personnel.

Figure 2:
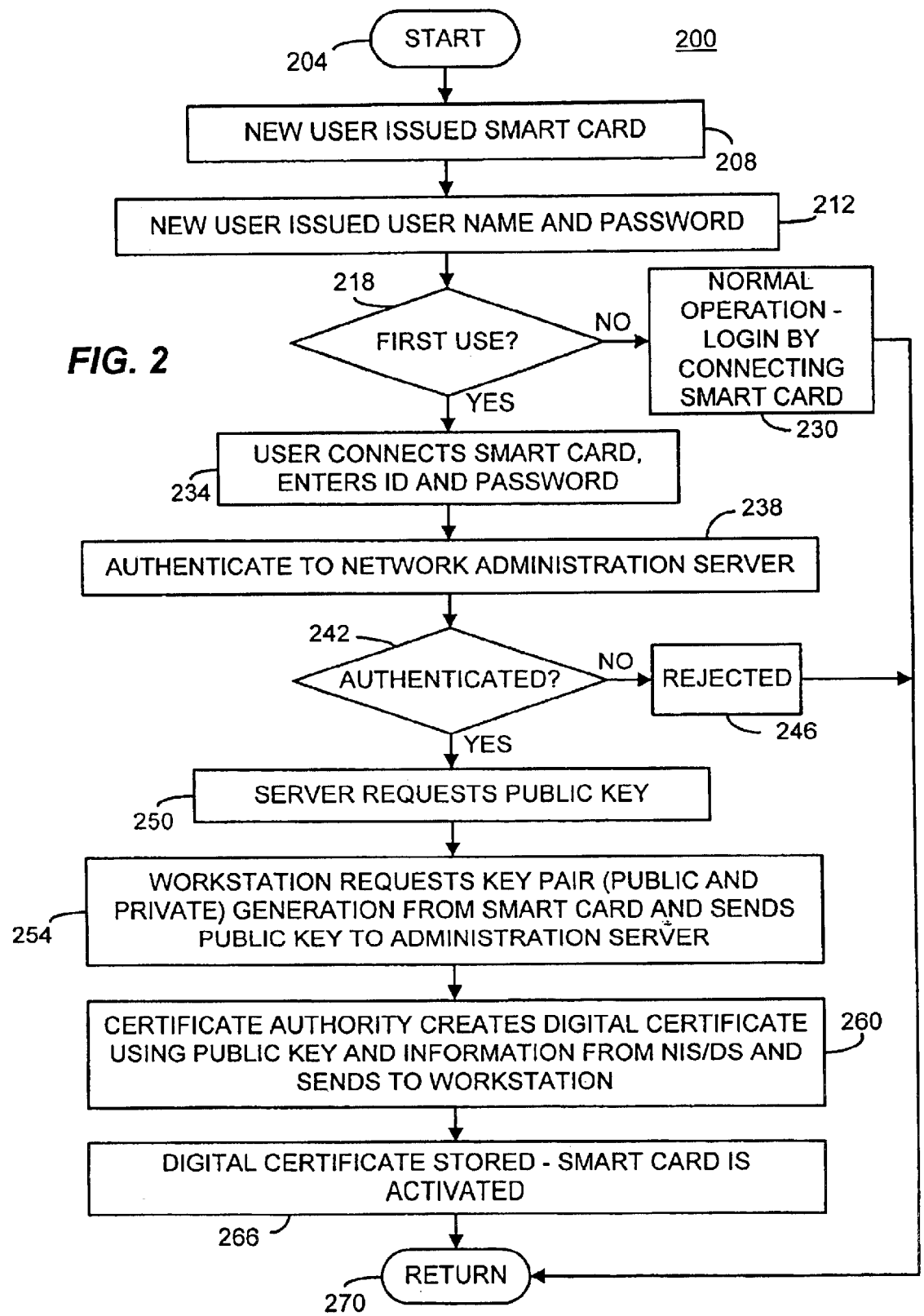
FIG. 2 is a flow chart of a smart card activation process consistent with an embodiment of the present invention.

FIG. 2 illustrates a simplified smart card activation process 200 starting at 204. When a new user is to be allowed access to computing resources, the new user is issued a smart card 110 at 208 and a user name (user ID) and password at 212. If, at 218, the smart card 110 is not being used for the first time, control passes to 230 where normal operation is carried out with the user logging in by connecting the smart card 110 at 230. Upon the first use of the smart card 110 at 218, the user connects the smart card 1 10 at 234 and enters his or her user ID and password. The network administration server receives the user ID and password as well as identifying information from the smart card 110 at 238.

If at 242 the user is not properly authenticated, then the login is rejected at 246. If the smart card 110 is properly authenticated at 242, control passes to 250 where the server requests a public key from the smart card 110. The workstation 120 requests a pair of keys (a public key and a private key) from the smart card 110 and sends the public key to the administration server. At 254, a certificate authority, in this case coexisting with the administration server 130, creates a digital certificate using the public key and information from the NIS/DS database and sends the certificate to the workstation 120 at 260. At 266 of the smart card 110 is thus activated upon receipt of the digital certificate. The digital certificate may be stored at the smart card 110 or workstation 120 or simply retained at the certificate authority and towards the administration server. The activation process ends at 270.

Figure 3:
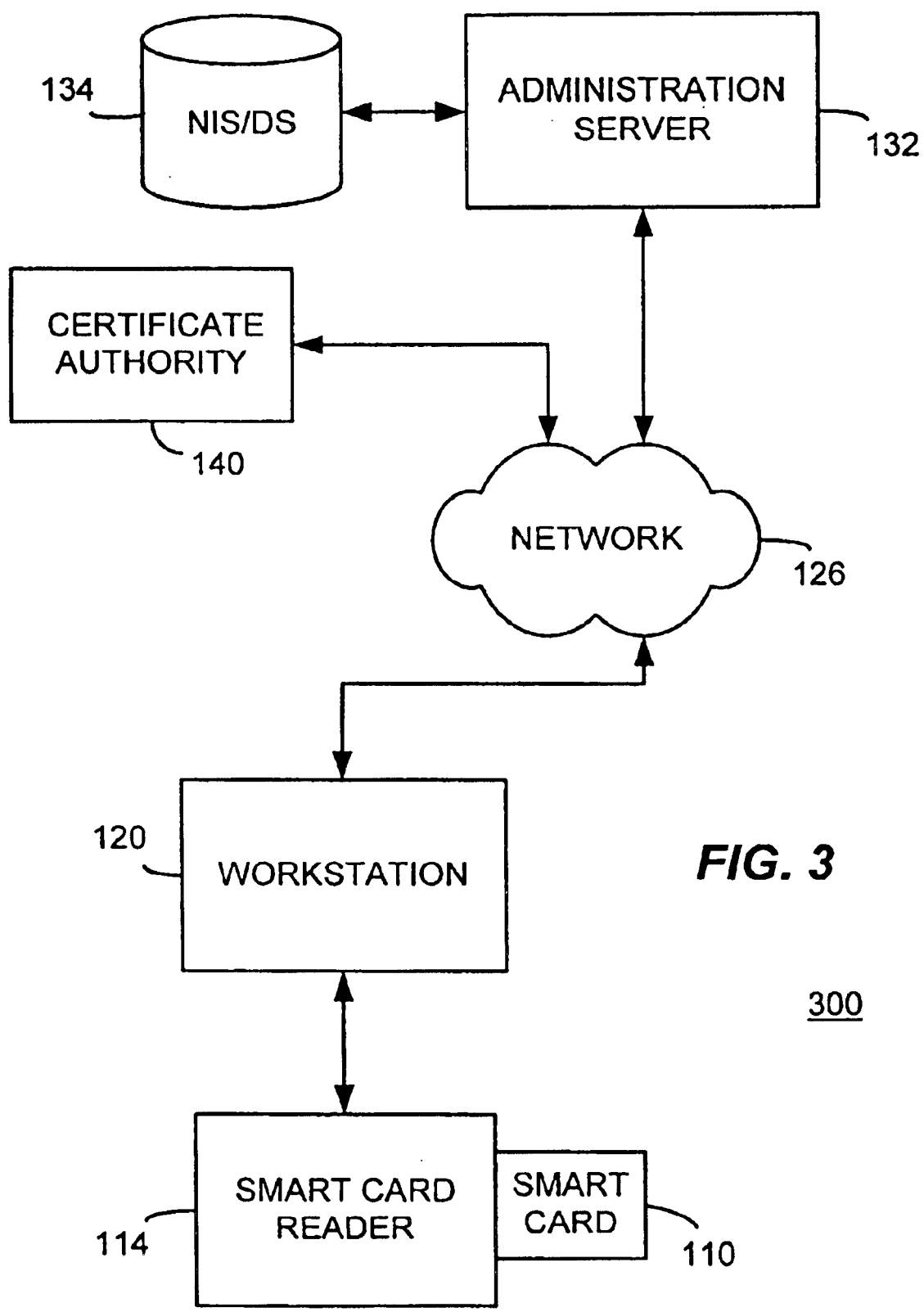
FIG. 3 is a block diagram of another system suitable for use of an embodiment consistent with the present invention.

In the example just described, the administration server 130 also has the role of certificate authority (CA). However, the certificate authority may be a separate entity as illustrated in exemplary network 300 of FIG. 3. In this example, the administration server 132 provides network administration services while a separate certificate authority 140 is also coupled to the network to handle issuance of digital certificates. Certificate authority 140 may reside locally or be connected to the network 126 via the Internet or other wide area or local area network. The simplified authentication process described in connection with exemplary network 100 and process 200 can be carried out in much the same manner with slight modifications as illustrated by process 400 of FIG. 4.

Process 400 begins after 250 of process 200 and substitutes for 254 and 260. When the server requests a public key at 250 of process 200, control passes to 454 of 400 where the workstation 120 requests the smart card 110 to generate a key pair (public and private) and sends the public key to the administration server. The administration server requests the certificate from the certificate authority at 458 and the certificate authority creates a digital certificate using the public key and information obtained from the administration server at 460. Control then passes to 266 and 270 as in process 200.

Thus, the activation of the smart card 110 is simplified by requiring minimal network administration action with the smart card 110 being essentially self activating upon the user initiating a first login using user ID and password. After this initial login, the normal login procedure can be determined by the setup of the user login parameters within the network. FIG. 5 illustrates as screen shot 500 of a smart card login configuration window showing several exemplary possible login scenarios that can be provided (in whole or in part) once the user's smart card 110 is authenticated. In one scenario, suitable for lower security applications, a user can login to the network using only the smart card 110 without need for a PIN, password or user ID. Other scenarios, increasing in security level from top to bottom, can also be provided.

In one login scenario, a smart card 110 can be used to automate the login process for users not requiring the highest levels of security. In this scenario, the user is authenticated using the smart card 110 in accordance with the process described above, providing the authentication for the card holder without need for PIN, password or user ID. Of course, this results in a lower level of security and makes a system vulnerable to access using borrowed, lost or stolen smart cards. However, in some networks for some users, this may provide an acceptable security risk in exchange for the simplification in login.

Figure 6:
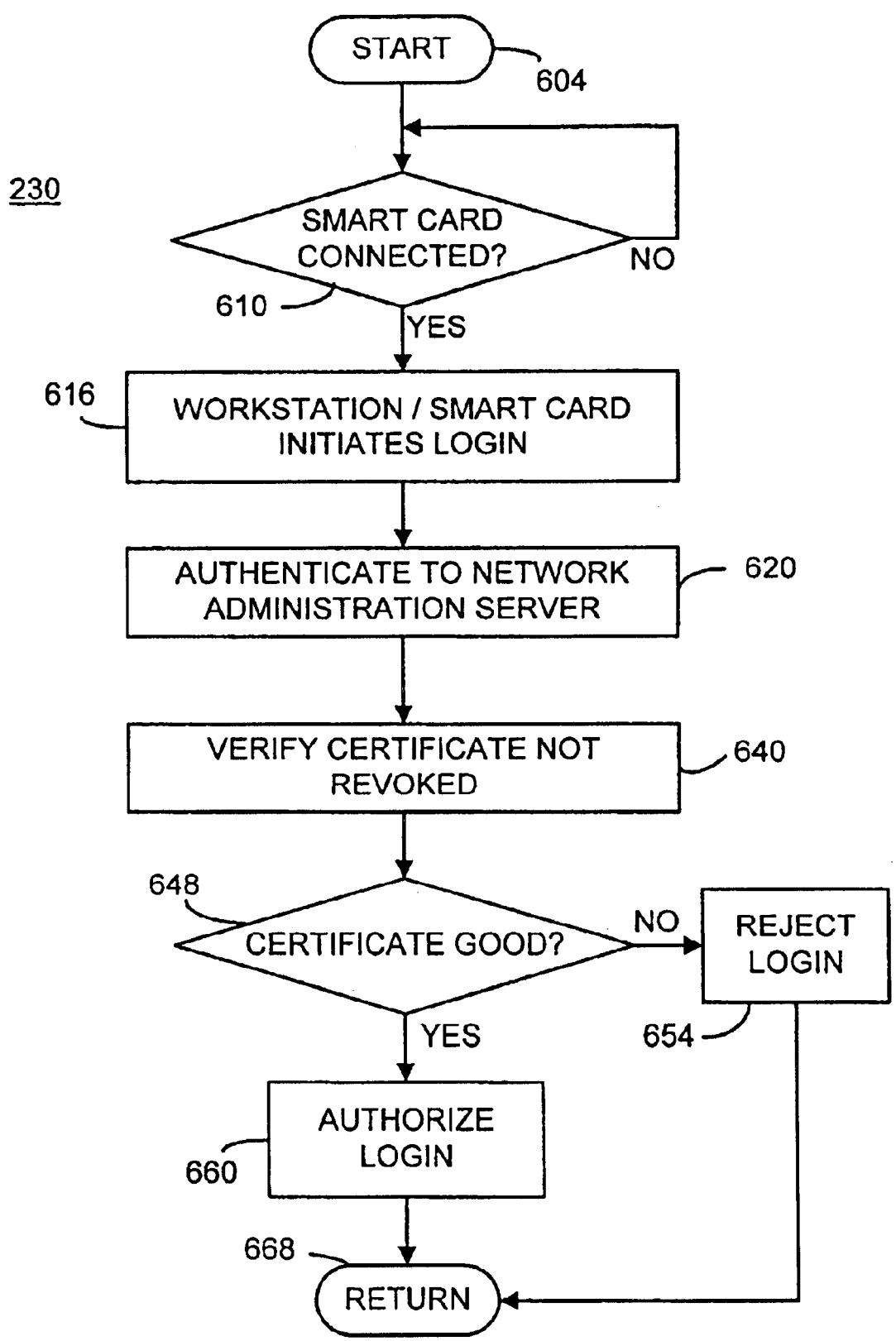
FIG. 6 is a flow chart illustrating a process consistent with an embodiment of the present invention for use of a smart card for simplified access to a computing resource.

Process 230 of FIG. 6 describes use of a smart card 110 as an aide to simplified login and to provide authentication starting at 604. At 610, the process determines if the smart card 110 is connected, and if not, awaits connection of a smart card 110. Once a smart card 110 is connected to the workstation 120 at 610, the smart card 110, in conjunction with the workstation 120, initiates a login at 616. This may be accomplished, for example, by sending a message out over the network alerting network servers that a smart card 110 is connected. The smart card 110 is then authenticated at 620. This may be accomplished, for example, by challenging the smart card 110 to carry out an encryption operation using its private key. If the encrypted information can be correctly decrypted at the server using the public key, then it is presumed that the smart card 110 is properly authenticated. The authentication process of 620 also utilizes the digital certificate and verifies that the certificate has not been revoked at 640 as a further portion of the authentication process. If the certificate is not good (for example if the certificate is indicated as having been revoked by its presence on a certificate revocation list) the login is rejected at 654. If the certificate is good at 648, login is authorized at 660 and process ends at 688.

Using process 230 of FIG. 6, the user can easily initiate a login by simply inserting the smart card 110 into smart card reader 114 and awaiting an on screen indication of a completed login. Since loss of a card is perhaps the most serious threat to security in such a system, it is desirable that in one embodiment, the card be removed after the authentication is complete. Thus, the user inserts the card until login is complete and then removes the card to carry out a session on the computer resource. When the session is complete, the user logs out to prohibit unauthorized use.

Thus, the present invention provides for a simplified mechanism for activating a smart card and for logging into a computer network. Many variations will occur to those skilled in the art.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form, and that can be stored in any suitable electronic storage medium or that can be transmitted over any electronic communication medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of activating a smart card, comprising:
   receiving identifying information for a non-activated smart card that is being used for the first time by a user;
   receiving manual authentication information for the user to whom the non-activated smart card has been issued;
   authenticating the user and the non-activated smart card using the identifying information and the manual authentication information;
   obtaining a public key from the non-activated smart card; and
   issuing a digital certificate that is generated using the public key, wherein the non-activated smart cart is activated upon receiving the digital certificate.

2. The method according to claim 1, wherein the manual authentication information comprises a user identifier and a password.

3. The method according to claim 1, further comprising obtaining the digital certificate from a certificate authority.

4. The method according to claim 1, wherein the smart card is connected to a workstation.

5. The method according to claim 1, wherein the digital certificate is stored in at least one of the activated smart card and a workstation.

6. The method according to claim 1, further comprising:
   receiving a login request that is initiated when the activated smart card is connected to a workstation;
   authenticating the activated smart card using the digital certificate; and
   if authenticated, permitting a login to a computer resource.

7. The method according to claim 6, wherein the activated smart card is removed from the workstation after it is authenticated.

8. The method according to claim 6, wherein authenticating the activated smart card further comprises determining that the digital certificate has not been revoked.

9. A method of activating a smart card, comprising:
   sending, to an administration server, identifying information read from a non-activated smart card that has not been previously used by a user to whom the non-activated smart card has been issued;

sending, to the administration server, manual authentication information input by the user;

generating a public key using the non-activated smart card;

sending the public key to the administration server; and receiving a digital certificate that is generated using the public key, wherein the non-activated smart card is activated upon receipt of the digital certificate.

10. The method according to claim 9, wherein the manual authentication information comprises a user identifier and a password.

11. The method according to claim 9, further comprising receiving the digital certificate from a certificate authority.

12. The method according to claim 9, wherein the smart card is connected to a workstation.

13. The method according to claim 9, further comprising storing the digital certificate in at least one of the activated smart card and a workstation.

14. The method according to claim 9, further comprising:

connecting the activated smart card to a workstation;

sending a login request to a server that authenticates the digital certificate against a certificate revocation list; and if authenticated, permitting a login to a computer resource.

15. The method according to claim 14, wherein the activated smart card is removed from the workstation after the digital certificate is sent.

16. The method according to claim 14, wherein the server determines that the digital certificate has not been revoked.

17. A method of activating a smart card then using an activated smart card, comprising:

on first use of a non-activated smart card by a user to whom the non-activated smart card has been issued:

receiving identifying information for the non-activated smart card;

receiving manual identification information for the user;

authenticating the user and the non-activated smart card using the manual authentication information and the identifying information;

obtaining a public key from the non-activated smart card; and sending a digital certificate generated using the public key from a certificate authority to the non-activated smart card, wherein the non-activated smart card is activated upon receiving the digital certificate; and on a subsequent use of the smart card:

receiving a login request that is initiated when the activated smart card is connected to a workstation;

authenticating the digital certificate against a certificate revocation list to determine that the digital certificate has not been revoked; and if authenticated, permitting a login to a computer resource.

18. The method according to claim 17, wherein the activated smart card is connected to a workstation and removed from the workstation after it is authenticated.

19. The method according to claim 17, wherein the digital certificate is stored in at least one of the activated smart card and a workstation.

* * * * *